UNITED STATES PATENT OFFICE.

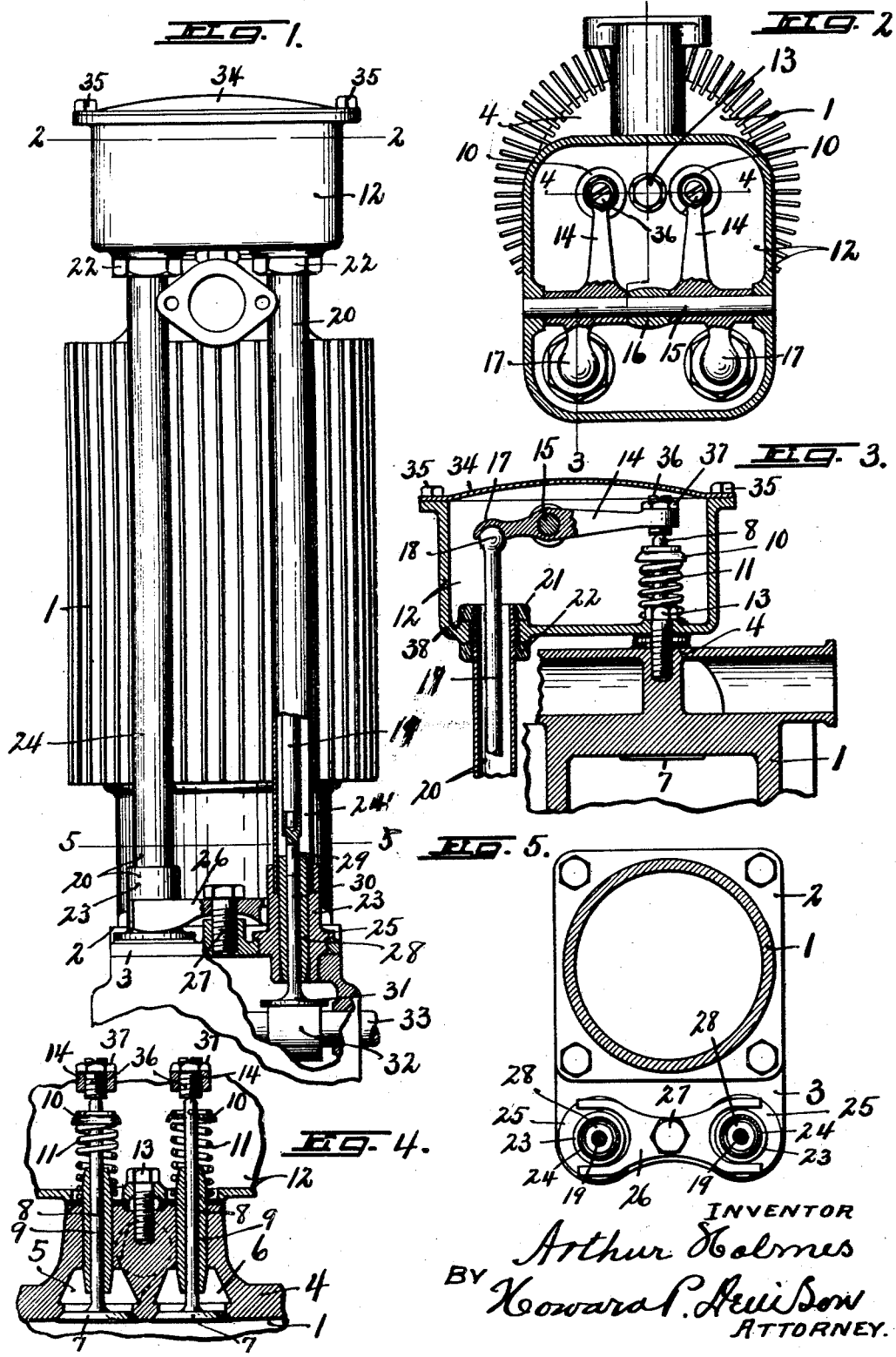

ARTHUR HOLMES, OF SYRACUSE, NEW YORK, ASSIGNOR TO THE HOLMES AUTOMOBILE COMPANY, OF CANTON, OHIO, A CORPORATION OF OHIO.

VALVE-OPERATING MECHANISM FOR GAS-ENGINES.

1,332,294.  Specification of Letters Patent.  Patented Mar. 2, 1920.

Application filed December 26, 1916. Serial No. 138,917.

*To all whom it may concern:*

Be it known that I, ARTHUR HOLMES, a citizen of the United States of America, and resident of Syracuse, in the county of Onondaga, in the State of New York, have invented new and useful Improvements in Valve-Operating Mechanisms for Gas-Engines, of which the following, taken in connection with the accompanying drawings, is a full, clear, and exact description.

This invention relates to certain improvements in valve-operating mechanisms for gas engines, and is peculiarly adapted for use in combination with valves located in the cylinder head.

The object of the invention is to produce an efficient valve-operating mechanism which shall be a unit with the cylinder, and at the same time operate to compensate for changes in clearance between the valve stem and the walking beam actuating the same.

The inefficiency of other valve-operating mechanisms, when the valves are located in the cylinder head and the walking beam supported upon the cylinder head, results from changes or variations in clearance between the walking beam and the valve stem caused by non-uniform expansion, due to unequal changes in temperature of the cylinder, valve lifter rods, valve stems and other associated parts under operating conditions.

As stated, the valve mechanism is in general mounted on the cylinder head, and expansion of the cylinder, as its temperature rises under operating conditions, carries the walking beams away from the lifter rods, thereby increasing the clearance between the parts constituting the valve mechanism, resulting in considerable noise and inefficient operation of the valves.

For instance, the normal clearance of the valve stem and the walking beam may efficiently be approximately .003 of an inch. Under high temperatures, the cylinder may expand .050 of an inch, whereas the lifter rod not being subjected to equally high temperatures expands only slightly.

The result is that the clearance between the walking beam and the valve stem or the walking beam and the lifter rod becomes so great under high temperatures as to render the operation of the engine inefficient and noisy.

Another source of trouble in automobile engines is that users of such engines attempt to adjust the valves under different conditions of temperature, as when the motor is cold, warm or hot, and as the clearance is different under all these conditions, they frequently cause trouble by timing the valves too close so that under some conditions, the valves are held open, resulting in spoiling the valve seat and the necessity of regrinding the valve, and the purpose of this invention is to produce a mechanism which will operate automatically to maintain a substantially uniform clearance under all conditions of temperature variation.

I have discovered that this object may be accomplished by mounting the support for the valve-operating mechanism on both the top of the cylinder and an extension or flange from the base of the cylinder, allowing one side of the support to move with the cylinder, while causing the other to remain stationary with the lower flange of the cylinder.

Then, by mounting the pin or shaft upon which the walking beams operate between the movable end of the support and the stationary end, a location can experimentally be found for such shaft or pin, such that no practical change occurs in valve clearance.

There is a great advantage in having the stationary portion of the support held at a predetermined position relatively to the base of the cylinder, not only because of economy and efficiency in assembling the parts, but because a unit construction has many advantages of adjustment.

In cases of change in alinement of parts under service, this invention becomes of material benefit because all of the operating mechanism is a unit with the cylinder, and the predetermined position of the stationary portion of the support is determined by a portion of the cylinder itself, so that the parts are always in alinement and require no fitting.

Other objects and advantages relate to the specific details of construction, as will more clearly appear from the following description, taken in connection with the accompanying drawings, in which—

Figure 1 is a side elevation, partly in section, of an engine cylinder and valve-operating mechanism utilizing the invention of this application.

Fig. 2 is a section on line 2—2, Fig. 1.

Fig. 3 is a section of a portion of the apparatus shown in Fig. 1, and taken on a line corresponding to line 3—3, Fig. 2.

Fig. 4 is a section taken on line 4—4, Fig. 2.

Fig. 5 is a section taken on line 5—5, Fig. 1.

The apparatus, as shown, comprises a cylinder —1— having its base —2— provided with a laterally extending flange —3—.

The head —4— of the cylinder is provided with the usual inlet and exhaust ports —5— and —6— controlled by valves —7— having their stems —8— extending through bushings —9— mounted in the cylinder head. The stems —8— are provided adjacent their upper ends with washers —10— for confining springs —11— adapted to normally hold the valves —7— in closed position.

A suitable member —12—, which may be of various forms, but, in this specific illustration, is shown as a cup-shaped shell or housing, is mounted upon the cylinder head and is rigidly secured thereto at a single point by bolt —13—.

Preferably the member —12— or, in this instance, the housing —12— is provided with openings fitting over the bushings —9— and, as shown, the housing —12— may be spaced from the head of the cylinder by suitable gaskets —13'— surrounding the bushing. The springs —11— may, as shown, be confined between the gaskets —13'— and the washers —10—.

The openings in member —12— fitting over bushings are preferably of considerably greater diameter than the bushings, and of a size sufficient to permit the free passage of washers —10— and springs —11— so that the member —12— and parts carried thereby can be assembled or disassembled without disturbing the valve mechanism.

The walking beams —14— for actuating the valves —7— are mounted upon a shaft —15— having its ends journaled in opposite sides of the housing —12— and its intermediate portion carried by post —16—, likewise mounted upon the housing —12—.

The rear ends of the walking beams are preferably provided with concave heads —17— adapted to receive the spherical heads —18— upon lifter rods —19—.

The details of construction and arrangement of each of the lifter rods and their supporting and actuating parts is identical, such details being shown with respect to one of the rods only.

Each rod is movably mounted in a tube —20—, the upper end of the tube being threaded and secured relatively to the housing —12— by lock nuts —21— and —22—, the opening through the housing for receiving the tube being of slightly greater diameter than the external diameter of the tube.

The lower end of each tube is secured to the flange —3— extending laterally from base —2— of the cylinder —1— and, as shown, the tube is formed in two parts, the lower portion —23— of which may be a casting having a seat for the reception of the upper portion —24—, the two parts being brazed or otherwise secured together.

Preferably the lower end of the tube is formed with a series of stepped portions, one of the same forming a flange —25— adapted to rest upon the upper surface of flange —3—, and a clamp —26— is provided adjustably secured to the flange —3— by bolt —27— and having portions partially surrounding each of the adjacent tubes —20— and adapted to engage the flange —25— for holding the tubes rigidly associated with the flange —3—.

The tubes —20— at their lower ends are adapted to receive and retain bushings —28—, in which the lifter rods are slidably mounted.

For assembling purposes, the lifter rods —19— are formed of two separate parts —29— and —30— having their ends abutting, preferably within the bushing —28— to hold the parts in exact alinement.

The lower ends of the lifter rod may be provided with a suitable head —31— for contact with cam —32— upon rotating shaft —33— adapted to intermittently raise and permit the lowering of the lifter rod.

Preferably the housing —12— is provided with a suitable cover —34— which may be secured thereto in any suitable manner, as by bolts —35—.

The normal clearance between walking beam —14— and valve stems —8— may be easily adjusted by means of screw contacts —36— forming a part of the walking beams and adapted to be locked relatively to the remaining portion of the beams by nuts —37—.

It will be apparent now that as the cylinder —1— expands vertically under rising temperatures, the end of the housing —12— secured to the head of the cylinder by bolts —13— will rise along with the cylinder, whereas the end —38— will be held substantially in its original position by the tubes —20— secured thereto and to the base flange —3—, which base flange remains at all times a substantially fixed part with respect to the cylinder and determines the position of the portion —38— of housing —12—.

By reason of this fixed position of portion —38—, a pivotal axis for the walking beams —14— may be determined most easily by experiment and testing with which axis clearance between the valve stem and the walking beam, or the valve stem and the lifter rod will remain substantially uniform under any variation in temperature condition of the parts.

The pivotal axis for the walking beams is found to be approximately twice as far from the valve stems as from the lifter rods and can be accurately and easily determined by experimentation.

The entire valve-operating mechanism may be removed by merely removing bolts —13— and —21— and without disturbing any other parts of the engine and may be easily and rapidly assembled with the engine in the reverse manner.

Although I have shown and described one specific construction, form and arrangement of the parts, I do not desire to limit myself to the same, as many changes and variations may be made in construction, form and arrangement without departing from the spirit of this invention as set forth in the appended claims, the primary feature of which resides in the unitary assemblage and arrangement of the parts of the mechanism by which one portion of the housing or support for the valve-operating mechanism is held in substantially stationary predetermined position relatively to a portion of the engine cylinder, as the flange —3— formed at the base thereof, under varying temperatures.

What I claim is:

1. In an internal combustion engine, a cylinder having ports, valves for said ports, means for normally holding the valves in closed position, a member secured to the upper end of the cylinder, said member being free to tilt about its connection with the cylinder independently of the cylinder and the said valves and the means for holding said valves in closed position, said member projecting laterally from the cylinder, a rigid connection between said laterally projecting portion and the engine base, walking beams pivotally carried by said member, the pivot of said walking beams being so disposed lengthwise of the beams that vertical expansion of the cylinder does not vary the operating relation of the walking beams and the valves, and means for actuating the walking beams.

2. In an internal combustion engine, the combination with a cylinder having a port in its head, and a valve for said port having a stem projecting outwardly from the cylinder and spring means for holding said valve in closed position, of a member fitted over said valve stem and spring and secured to the cylinder and tiltable with reference to the cylinder independently of said valve and its stem and removable from the cylinder without movement of said valve stem or spring, means for rigidly connecting said member to the engine base, a walking-beam pivotally carried by said member for actuating the valve and a lifter-rod for actuating the walking-beam.

3. The combination with a cylinder having a pair of ports in its head and valves for said ports having stems projecting outwardly from the cylinder and springs surrounding said stems for normally holding valves in closed position, of a casing like member fitted over said valve stems and springs and having a single point of connection to the cylinder intermediate the said valve stems, means for effecting said single point connection, means for connecting said casing like member to the cylinder base, walking-beams pivotally carried by said member for contact with respective valve stems and lifter-rods for actuating the walking-beams, the pivot of said walking-beams being so disposed lengthwise of the beam that vertical expansion of the cylinder does not materially vary the operating relation of the walking-beams, the lifter-rods and the valve stems.

In witness whereof I have hereunto set my hand this 21st day of December, 1916.

ARTHUR HOLMES.

Witnesses:
E. A. THOMPSON,
ALICE M. CANNON.